March 30, 1926.
J. H. ALTER
VALVE GEAR
Filed Oct. 24, 1921
1,578,249
2 Sheets-Sheet 1
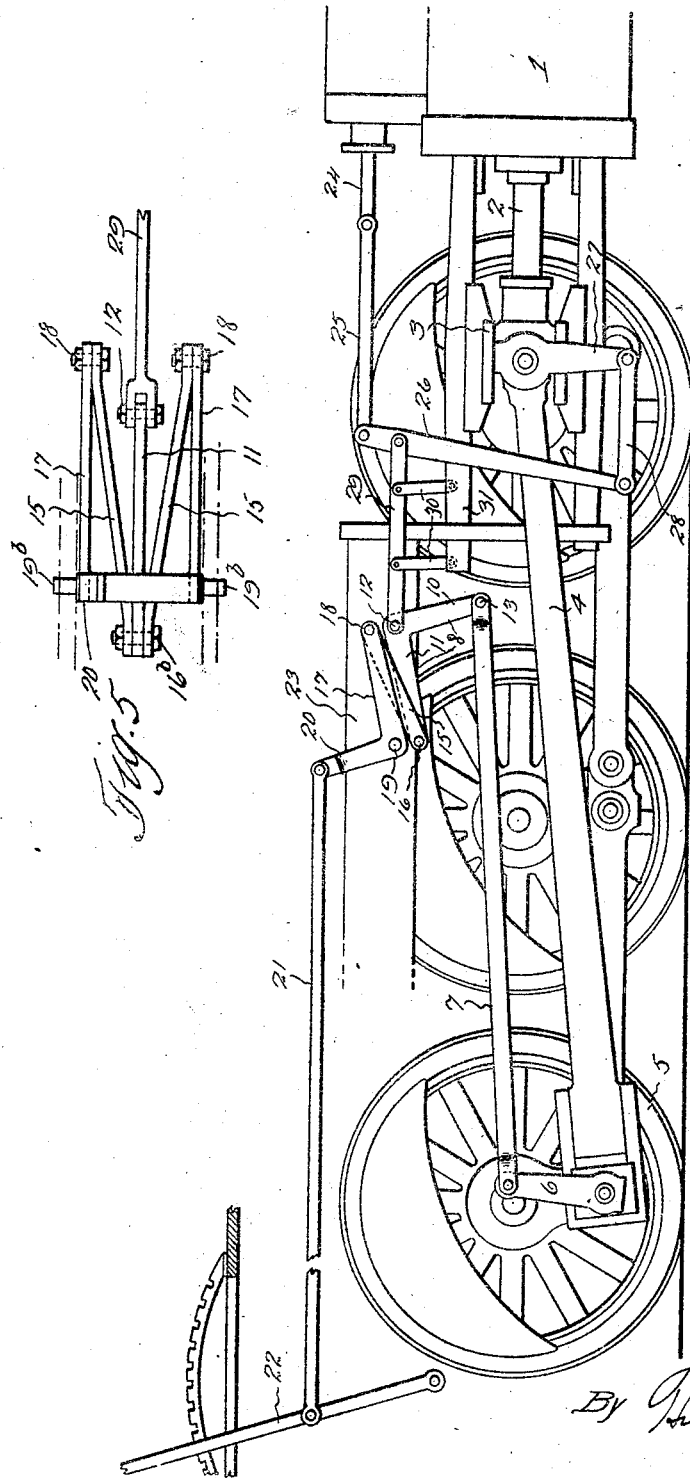

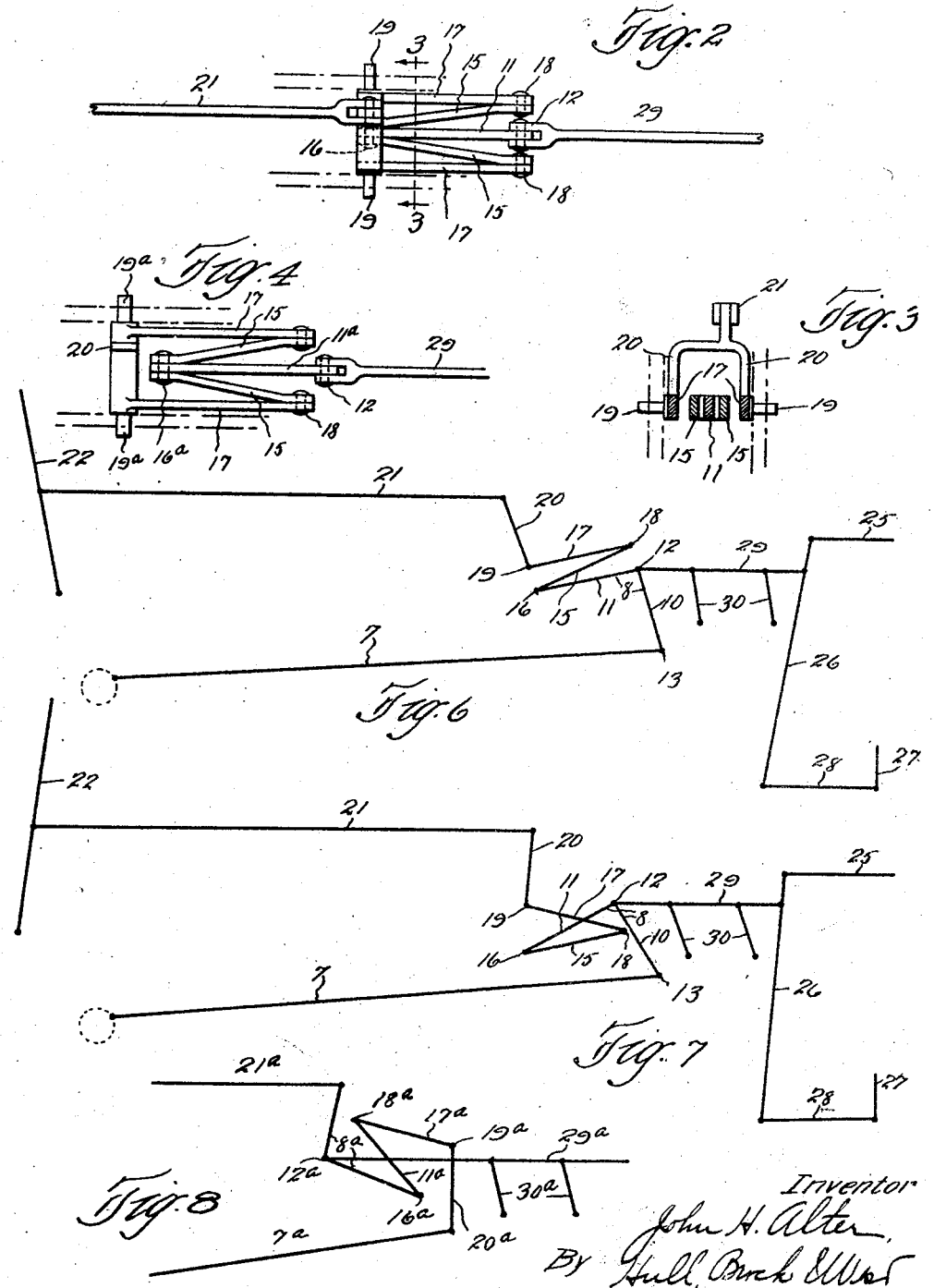

Patented Mar. 30, 1926.

1,578,249

UNITED STATES PATENT OFFICE.

JOHN H. ALTER, OF CONNEAUT, OHIO.

VALVE GEAR.

Application filed October 24, 1921. Serial No. 510,135.

*To all whom it may concern:*

Be it known that I, JOHN H. ALTER, a citizen of the United States, residing at Conneaut, in the county of Ashtabula and State of Ohio, have invented a certain new and useful Improvement in Valve Gears, of which the following is a full, clear, and exact description, reference being had to the accompanying drawings.

This invention relates to valve gears and is directed more particularly to a variable cut off and reversing valve gear for locomotives although it is equally well suited for all classes of steam, air or other fluid propelled engines.

Some of the objects of the present invention are to provide a valve gear which is adapted to operate the valve so as to provide equal steam distribution on both sides of the piston for variable points of cut off in both the forward and back motions; to provide a valve gear which shall operate the valve at alternately fast and slow speeds during its travel thereby to effect a quick and full opening of the admission port at the proper period or beginning of each piston stroke and maintain such opening until near the point of cut off and then effect a quick cut-off and release; to provide a valve gear which shall consist of few parts which are simple in construction and inexpensive to manufacture; to provide a valve gear which shall consist of a minimum number of moving parts, all of which may be of a pivoted nature and hence eliminate any sliding bearings which might collect dust and dirt and cause undue wear between moving surfaces which would cause lost motion in the gear; to provide a valve gear which may be compensated at a plurality of points for irregularities of the main and eccentric rod, or any other irregularity that might occur due to the principle of change of levers or to angularity of the valve gear parts; while further objects and advantages will appear as the description proceeds.

In the accompanying drawings wherein I have shown certain illustrative embodiments of my invention but without intent to limit myself thereto, Fig. 1 is a side elevation of my valve gear attached to a locomotive; Fig. 2 is a plan view of the reverse yoke and connection lever assembled; Fig. 3 is a sectional view taken on the line 3—3 of Fig. 2; Figs. 4 and 5 are views similar to Fig. 2 but showing modified forms of connection, Figs. 6 and 7 are diagrammatic views illustrating the position of the various parts in the reverse and forward motions respectively, and Fig. 8 is a diagrammatic view illustrating a modified form of connection.

It will be understood that each cylinder and valve is operated through a valve gear similar to that to be described hereinafter. In the drawings, 1 indicates the cylinder, 2 the piston rod and 3 the cross head and 4 the main rod which is operatively connected to a driving wheel 5 in the usual or any approved manner. An eccentric crank 6 is also connected to the driving wheel 5 and has the free end thereof connected through an eccentric rod 7, with one end of a bell crank 8. The arms 10 and 11 of this bell crank, which I term the connection lever and motion arm, respectively, may or may not define a right angle. The pivotal connection of bell crank 8 with the valve mechanism is indicated at 12 and the pivotal connection of eccentric rod 7 with connection lever 10 is indicated at 13 and these pivot points as well as others to be referred to hereinafter are located in such manner as to compensate for any irregularities of the main and eccentric rods or irregularities of any other parts of the gear. The bell crank 8 is what may be termed a floating bell crank, i. e., the pivotal points 12, 13 and 16 are not pivoted to a fixed point of a stationary object.

A pair of radius links 15 are each pivotally connected at one end to the end of the motion lever 11 as indicated at 16 and at their opposite ends said links are pivotally connected to the reverse yoke 17 as indicated at 18. The reverse yoke is essentially a bell crank which may or may not define a right angle, and this yoke is mounted in a suitable frame 23 for pivotal movement about the trunnions 19, 19. The arm 20 of the reverse yoke is pivotally connected to a reach rod 21 which is connected at its opposite end to a reverse lever indicated at 22.

The valve stem is indicated at 24 and is pivotally connected to a valve rod 25 which in turn is connected with the lap and lead lever 26. The lap and lead lever may be mounted in the usual or any approved manner and in the present instance is shown connected with the cross head arm 27, through union link 28. The variable cut off and reversing mechanism is connected at its other end to the lap and lead lever 26, and this rod is supported by pivotally connected parallel rockers 30 which may be fastened to a cross head guide 31 or any other suitable support.

I have found that a valve gear constructed and arranged as described, may be compensated for irregularities of the various parts, at a number of points so as to produce an ideal valve motion. That is, pivot point 19 may lie on an arc drawn with point 18 as a center and passing through point 16 as shown in Figs. 1, 2 and 6 or point 19 may lie to the right or left of such an arc. As an example of the latter cases, reference may be had to Figs. 4 and 5. In Fig. 4 I have shown the reverse yoke pivot point 19$^a$ disposed to the left of the pivot point 16$^a$, and in Fig. 5 I have shown the pivot point 19$^b$ disposed to the right of the pivotal point 16$^b$. Furthermore, the pivotal point of the reverse yoke bell crank may or may not form a right angle with reference to the pivotal connection between the reach rod 21 and the arm 20, and the pivotal connection 18 between the reverse yoke and radius bars 15. In other words, the arms 11, 15 and 17 may be of equal length as shown in Figs. 1, 2 and 6 or may be of unequal length as shown in Figs. 4 and 5.

The same compensating features are true with respect to bell crank 8, that is pivotal connection 12 may be on an arc drawn through point 18, with point 16 as a center which is the case as shown in Figs. 1, 2 and 6, or point 12 may be to the right of such arc as is the case in Fig. 4, or to the left of such arc as in Fig. 5. Further the points 16, 12 and 13 may or may not define a right angle, and with points 16 and 12 defining a horizontal line, point 13 may be disposed in vertical alignment with point 12 or may lie to the right or left of such vertical line. In other words, the gear may be compensated at a plurality of points so that the valve will have the desired motion and have equal cut-off in the forward and reverse movements over the entire range of variable cut-off points.

A further compensating effect may be secured by varying the angle which rockers 30 normally make with respect to radius rod 29. That is, the radius rod 29 moves in an arcuate path with rockers 30, 30 as a radius and it will be obvious that the horizontal speed of said rod increases as the rockers approach a vertical position and decreases as said rockers recede from such vertical position. A path between any two points on this arc can be selected by changing the pivotal points of the rockers, and the motion derived from this source cooperates with the motion from the other points of the gear to produce an ideal valve motion, or in other words it is possible by shifting the pivotal points of rockers 30, 30 to compensate for any irregularities in the other elements of the gear.

Referring now to Fig. 6 wherein the parts are shown in the reverse motion, it will be seen that the eccentric rod 7 will impart an oscillating motion to connection lever 10 and motion arm 11. These members, which form the bell crank 8, will have a movement of translation with respect to the pivot 18 and impart a reciprocating motion to the radius rod 29. The combined motions of radius rod 29 and lap and lead lever 26 impart the desired motion to the valve rod 25, the lap and lead lever being of any approved type and forming no part of the present invention, a description of its motion is thought to be unnecessary. By referring to Fig. 6, it will be obvious that as the reverse lever 22 is moved to its maxmium rearward position, the point 18 will be moved to its maximum distance above point 12 and this will cause maximum reciprocation of valve rod 25 which will give the largest cut off. Similarly, as the reverse lever 22 approaches its neutral point, the point 18 will approach point 12 and decrease the reciprocation of radius rod 29 and valve rod 25, which of course shortens the cut off. When reverse lever 22 has been moved in such position that point 18 coincides with point 12, then motion of the eccentric rod 7 and bell crank 8 will be about points 18 and 12 which will not cause displacement of radius rod 29 and valve rod 25, hence the valve will remain stationary.

Referring now to Fig. 7, it will be seen that as reverse lever 22 is moved to its forward position, pivot point 18 will be moved below point 12 and the motion of valve rod 25 will be opposite to that received when in the reverse motion previously described When reverse lever 22 is in its extreme forward position the point 18 will be at its maximum distance below point 12 and hence radius rod 29 and valve rod 25 will receive maximum reciprocation which will give greatest cut-off in the forward motion. Similarly, as reverse lever is moved rearwardly toward neutral position, the point 18 will move toward point 12 and decrease the cut off until point 18 coincides with point 12 when the valve will remain stationary as previously described.

Inasmuch as a portion of the valve gear is composed of two bell cranks arranged in opposed relation and interconnected by radius link 15, it will be obvious that this portion of the gear may be inverted and still perform its function. In this latter case, the bell crank 8$^a$ (Fig. 8) becomes the reverse yoke and the other bell crank which previously functioned as the reverse yoke now becomes the motion arm and connection lever bell crank. The point 19$^a$ is a fixed pivot while point 12ª is a floating pivot. It will be noted that the valve rod is astuated by the bell crank 8ª in this instance and lever 20ª is connected to the eccentric rod 7ª. In operation, the motion of eccentric rod 7ª will cause connection lever 20ª and motion arm 17ª to rock about the fixed pivot 19ª as a center and hence point 18ª will move in an arc. The bell crank 8ª, being connected through the radius links 11ª with point 18ª, will move a horizontal distance equal to the projection of the maximum points of travel over the arc defined by point 18ª and this horizontal movement will be transmitted to the valve by radius rod 29ª. The neutral point of this particular gear arrangement is determined when point 16ª coincides with point 19ª and the forward and back motions are determined by the position of point 16ª above or below the point 19ª as previously described in connection with the other gear arrangements.

Having thus described my invention, what I claim is:

1. In a valve gear, the combination of a pair of bell cranks, a single element pivotally connected to an arm of each of said bell cranks, a reverse lever operatively connected with the other arm of one of said bell cranks, means for imparting a translatory motion to the other bell crank with respect to the pivotal connection between said element and the first mentioned bell crank, and an operative connection between the valve and the bell crank to which the translatory motion is imparted.

2. In a valve gear, the combination of a pair of bell cranks, a single link pivotally connecting an arm of each of said bell cranks, a reverse lever operatively connected with the other arm of one of said bell cranks, means for imparting a translatory motion to the other bell crank with respect to the pivotal connection of the link to the aforesaid bell crank, and an operative connection between the valve and the bell crank to which the translatory motion is imparted.

3. In a valve gear, the combination of a pair of bell cranks, one of said bell cranks having a fixed pivotal support, and the other of said bell cranks having a floating pivotal support, means connecting an arm of each of said bell cranks, a reverse lever operatively connected with the other arm of one of said bell cranks, means for imparting a translatory motion to the floating bell crank, and an operating connection between the floating bell crank and the valve.

4. In a valve gear, the combination of a pair of bell cranks, one of said bell cranks having a fixed pivotal support, and the other of said bell cranks having a floating pivotal support, a single link pivotally connecting an arm of each of said bell cranks, a reverse lever operatively connected with the other arm of one of said bell cranks, means for imparting a translatory motion to the floating bell crank, and an operating connection between the floating bell crank and the valve.

5. In a valve gear the combination with a bell crank mounted for pivotal movement about a fixed point, of a reverse lever operatively connected with one arm of said bell crank, a link operatively connected with the other arm of the bell crank, a floating bell crank connected with said link, a reciprocating connection between said last mentioned bell crank and the valve, on which connection said bell crank is pivotally supported, and means for imparting a translatory motion to said last mentioned bell crank.

6. In a valve gear, the combination with a pair of relatively fixed and floating levers each having three pivotal connection points thereon defining a triangle, a point on the fixed lever serving as a fixed pivot, a link connecting another of said points on said lever directly with a point on the floating lever, a reverse lever operatively connected with one of said points on one of said levers, means connecting one of said points on the floating lever for imparting a translatory motion to said lever as a whole with respect to the fixed lever, and an operative connection between a point on the floating lever and the valve.

7. In a valve gear, the combination with a reverse yoke having a fixed pivotal point and a pair of arms disposed angularly from said point, of a floating bell crank movable as a whole with respect to said yoke, a single link connection between an arm of said bell crank and an arm of said reverse yoke, a reverse lever operatively connected with the other arm of said reverse yoke, means connected with the other arm of said bell crank for imparting translatory motion thereto with respect to said yoke, and a connection with said bell crank and the valve, on which connection said bell crank is pivotally supported.

8. In a valve gear, the combination with a reverse yoke having a fixed pivotal point and a pair of arms disposed angularly from said point, of a floating bell crank movable as a whole with respect to said yoke and comprising a motion arm and a connection lever arranged angularly one with respect to the other, a reverse lever operatively connected with an arm of said reverse yoke, a single link connecting the other arm of said reverse yoke with said motion arm, an eccentric rod operatively connected with said connection lever and adapted to impart translatory motion to the floating bell crank, and means operatively connecting said bell crank to the valve.

9. In a valve gear, the combination of a pair of bell cranks, means connecting an arm of each of said bell cranks, a reverse lever operatively connected with the other arm of one of said bell cranks, means for imparting an oscillatory motion to the other bell crank, a rod mounted for arcuate movement operatively connected to one of said bell cranks, and an operative connection between said rod and the valve.

10. In a valve gear, the combination of a pair of bell cranks, a link pivotally connecting an arm of each of said bell cranks, a reverse lever operatively connected with the other arm of one of said bell cranks, an eccentric rod operatively connected to the other arm of the other bell crank and adapted to impart an oscillatory motion thereto, a rod mounted for arcuate movement operatively connected to one of said bell cranks, and an operative connection between said rod and the valve.

11. In a valve gear, the combination of a pair of levers, one of which is fixed and the other floating, a link pivotally connecting the levers, the link being oscillatable about the pivot connecting it to the fixed lever as a center, and the floating lever being free to move as a whole with respect to said pivot, a reversing device connected to the fixed lever, an operating device connected to the floating lever, and a connection from said floating lever to the valve.

In testimony whereof, I hereunto affix my signature.

JOHN H. ALTER.